(12) United States Patent
Harayama et al.

(10) Patent No.: US 11,196,079 B2
(45) Date of Patent: Dec. 7, 2021

(54) NONAQUEOUS ELECTROLYTE SECONDARY BATTERY

(71) Applicant: TOYOTA JIDOSHA KABUSHIKI KAISHA, Toyota (JP)

(72) Inventors: Takashi Harayama, Toyota (JP); Koji Takahata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 15/517,255

(22) PCT Filed: Sep. 16, 2015

(86) PCT No.: PCT/JP2015/004735
§ 371 (c)(1),
(2) Date: Apr. 6, 2017

(87) PCT Pub. No.: WO2016/056181
PCT Pub. Date: Apr. 14, 2016

(65) Prior Publication Data
US 2017/0309952 A1   Oct. 26, 2017

(30) Foreign Application Priority Data

Oct. 10, 2014 (JP) .............................. JP2014-209095

(51) Int. Cl.
*H01M 10/0525* (2010.01)
*H01M 10/0567* (2010.01)
*H01M 10/0568* (2010.01)

(52) U.S. Cl.
CPC .... *H01M 10/0525* (2013.01); *H01M 10/0567* (2013.01); *H01M 10/0568* (2013.01); *H01M 2300/0025* (2013.01); *Y02T 10/70* (2013.01)

(58) Field of Classification Search
CPC ......... H01M 10/0525; H01M 10/0567; H01M 10/0568; H01M 2300/0025; Y02T 10/7011
See application file for complete search history.

(56) References Cited

U.S. PATENT DOCUMENTS

| | | | |
|---|---|---|---|
| 2012/0244419 A1* | 9/2012 | Kwak | H01M 10/0567 429/163 |
| 2013/0183580 A1 | 7/2013 | Kako et al. | |
| 2014/0170487 A1 | 6/2014 | Takahata et al. | |
| 2014/0197796 A1* | 7/2014 | Sasaki | H01M 2/0217 320/128 |

(Continued)

FOREIGN PATENT DOCUMENTS

| | | |
|---|---|---|
| CN | 103733390 A | 4/2014 |
| EP | 2 571 089 A1 | 3/2013 |

(Continued)

*Primary Examiner* — Adam A Arciero
(74) *Attorney, Agent, or Firm* — Sughrue Mion, PLLC

(57) ABSTRACT

The nonaqueous electrolyte secondary battery 100 herein proposed is characterized by being manufactured by performing an initial charging and discharging treatment on an assembly, in which are accommodated in a battery case 80 an electrode body 40, and a nonaqueous electrolyte containing a compound expressed by a general formula: $A^+[PX_{6-2n}(C_2O_4)_n]^-$, the content of the compound being 1.1 mass % to 1.2 mass % when the total mass of the nonaqueous electrolyte is assumed to be 100 mass %.

15 Claims, 4 Drawing Sheets

(56) References Cited

U.S. PATENT DOCUMENTS

2015/0024284 A1* 1/2015 Takiguchi ......... H01M 10/0567
           429/338
2015/0086880 A1* 3/2015 Ahn ..................... H01M 4/485
           429/332
2015/0229002 A1 8/2015 Kawasoe et al.

FOREIGN PATENT DOCUMENTS

| | | |
|---|---|---|
| EP | 2 615 682 A1 | 7/2013 |
| JP | 2007-165125 A | 6/2007 |
| JP | 2013-145724 A | 7/2013 |
| JP | 2013-206793 A | 10/2013 |
| WO | 2013/132824 A1 | 9/2013 |
| WO | WO-2013147094 A1 * 10/2013 ........ H01M 10/0567 |
| WO | 2014/038174 A1 | 3/2014 |

* cited by examiner

NONAQUEOUS ELECTROLYTE SECONDARY BATTERY

TECHNICAL FIELD

The present invention relates to a nonaqueous electrolyte secondary battery. More particularly, the present invention relates to a nonaqueous electrolyte secondary battery capable of exhibiting desirable performances with stability.

The present application is a National Stage of International Application No. PCT/2015/004735, filed on Sep. 16, 2015, which claims priority based on Japanese Patent Application No. 2014-209095, filed on Oct. 10, 2014, the entire contents of which are incorporated by reference in the present description.

BACKGROUND ART

A lithium ion secondary battery and other nonaqueous electrolyte secondary batteries are smaller in size, lighter in weight, and higher in energy density, and are more excellent in output density than existing batteries. For this reason, in recent years, the secondary batteries have been preferably used as power supplies for driving vehicles such as hybrid cars and electric cars. In this kind of nonaqueous electrolyte secondary batteries such as lithium ion secondary batteries, the nonaqueous electrolyte is partially decomposed during charging. Accordingly, a film formed of the decomposed products thereof, namely, a SEI (Solid Electrolyte Interphase) film can be formed on the surface of the negative electrode active material (e.g., natural graphite particle). The SEI film plays a role of protecting the negative electrode active material, but is formed by consuming the charge carriers (e.g., lithium ions) in the nonaqueous electrolyte (i.e., the charge carriers are fixed in the SEI film, and thereby become unable to contribute to the battery capacity any longer). Accordingly, a large amount thereof causes the reduction of the capacity ratio (the degradation of the cycle characteristics).

To cope with such a problem, the following is performed: in order to previously form a stable film on the surface of the negative electrode active material in place of the SEI film, an additive which is decomposed at a prescribed charging voltage or higher and forms a film on the surface of the negative electrode active material is allowed to be contained in a nonaqueous electrolyte. For example, Patent Literature 1 discloses the nonaqueous electrolyte containing lithium difluorobis(oxalato) phosphate (LPFO) added therein as an additive. The same literature indicates as follows: when the amount of LPFO added is set at 0.3 mass % to 1.0 mass % based on the total mass of the nonaqueous electrolyte, the battery performances are improved.

CITATION LIST

Patent Literature

[PTL 1]
Japanese Patent Application Laid-open No. 2013-145724

SUMMARY OF INVENTION

However, the study by the present inventors has proved the following: when the amount of LPFO added in the nonaqueous electrolyte is set at 1.0 mass % or less, the initial negative electrode resistance is relatively lower; however, the negative electrode resistance tends to increase with time. An increase in negative electrode resistance with time results in precipitation of charge carriers (e.g., lithium in the case of a lithium ion secondary battery) at the negative electrode. This may cause a degradation of the battery performances. A secondary battery to be mounted in a vehicle driven on wheels by an electric motor such as a hybrid car or an electric car desirably exhibits desirable battery performances with stability even in long-term use. The present invention was completed in view of such respects. It is an object of the present invention to provide a nonaqueous electrolyte secondary battery capable of suppressing an increase in resistance with time, and exhibiting desirable battery performances with stability.

A nonaqueous electrolyte secondary battery provided by the present invention is characterized by being manufactured by performing an initial charging and discharging treatment on an assembly, in which are accommodated in a battery case an electrode body having a positive electrode and a negative electrode; and a nonaqueous electrolyte containing a compound expressed by a general formula (I): $A^+[PX_{6-2n}(C_2O_4)_n]^-$ (which may be hereinafter simply referred to as a "P-oxalato compound"), the content of the compound being 1.1 mass % to 1.2 mass % when the total mass of the nonaqueous electrolyte is assumed to be 100 mass %; and a battery case.

Incidentally, in the formula (I), $A^+$ is a cation of an alkali metal, X is a halogen atom, and n is 1, 2, or 3.

With the nonaqueous electrolyte secondary battery in accordance with such an aspect, a nonaqueous electrolyte containing a P-oxalato compound in the prescribed amount is injected into a battery case; then, the assembly is subjected to an initial charging and discharging treatment; as a result, a film derived from the P-oxalato compound is formed on the surface of the negative electrode (typically, the negative electrode active material present in the negative electrode). Such a film derived from the P-oxalato compound is more rigid and thicker than in the related art, and hence cracking of the film with time is less likely to be caused. For this reason, with the nonaqueous electrolyte secondary battery including a negative electrode having such a rigid and thick film derived from the P-oxalato compound, the formation of another film (typically, a film formed of the decomposed products of the nonaqueous electrolyte) resulting from cracking of the film derived from the compound is prevented, so that the negative electrode resistance is less likely to increase. For this reason, such a nonaqueous electrolyte secondary battery can exhibit desirable battery performances with stability even during long-term use.

For the nonaqueous electrolyte secondary battery herein disclosed, in the assembly, the content of the P-oxalato compound is properly 1.1 mass % or more, and preferably 1.12 mass % or more when the total mass of the nonaqueous electrolyte is assumed to be 100 mass %. When the content of the P-oxalato compound is too small, the film derived from the compound becomes more likely to be cracked. For this reason, the negative electrode resistance may increase with time. On the other hand, when the content of the P-oxalato compound is too large, the film derived from the compound becomes too thick. For this reason, the initial resistance may tend to increase. From the viewpoint of reducing the initial resistance, the content is generally 1.2 mass % or less, and is preferably 1.18 mass % or less.

In accordance with a preferable one aspect of the nonaqueous electrolyte secondary battery herein disclosed, the P-oxalato compound is lithium difluorobis(oxalato) phosphate (which may be hereinafter abbreviated as "LPFO"). LPFO is favorably decomposed in the initial charging and discharging step, and can form a film derived from the LPFO having preferable properties on the surface of the negative electrode (typically, the negative electrode active material). The film formed using such LPFO can be more excellent in, for example, negative electrode resistance increase suppressing performance.

In accordance with a preferable one aspect of the nonaqueous electrolyte secondary battery herein disclosed, the nonaqueous electrolyte included in the assembly further contains difluorophosphoric acid salt. When the total mass of the nonaqueous electrolyte is assumed to be 100 mass %, the content of the difluorophosphoric acid salt is 0.4 mass % to 0.8 mass %. By allowing a prescribed amount of difluorophosphoric acid salt and a prescribed amount of the P-oxalato compound to coexist in the nonaqueous electrolyte, it is possible to achieve a more excellent battery performance improving effect.

DESCRIPTION OF EMBODIMENTS

Below, a description will be given to preferred embodiments of the present invention. Incidentally, matters that are other than matters particularly mentioned in the present description and are required for carrying out the present invention can be understood as design matters of those skilled in the art based on the related art in the field. The present invention can be carried out based on the contents disclosed in the present description and the technical common sense in the field.

Incidentally, the term "nonaqueous electrolyte secondary battery" in the present description denotes a secondary battery including a nonaqueous electrolyte (typically, an electrolyte containing a supporting salt (supporting electrolyte) in a nonaqueous solvent). Whereas, the term "lithium ion secondary battery) denotes a secondary battery using lithium ions as electrolytic ions, and charging and discharging by the movement of lithium ions between positive and negative electrodes. A secondary battery commonly referred to as a lithium ion battery is a typical example included in the lithium secondary batteries in the present description. Further, the term "electrode active material" denotes a material capable of reversibly occluding and releasing chemical species serving as charge carriers (lithium ions in a lithium ion secondary battery).

Below, as one of preferred embodiments of the nonaqueous electrolyte secondary battery herein disclosed, a lithium ion secondary battery will be described in details as an example. However, it is not intended that the applicable objects of the present invention are limited to such a kind of secondary batteries. For example, the present invention is also applicable to nonaqueous electrolyte secondary batteries using other metal ions (e.g., sodium ions) as charge carriers.

Figure 1:
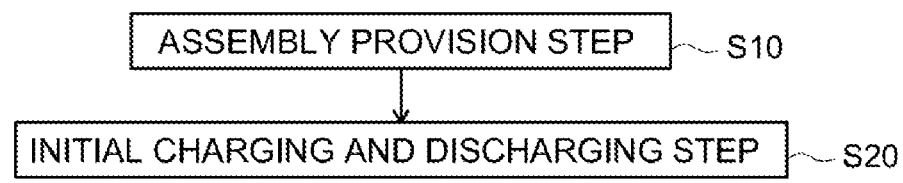
FIG. 1 is a flowchart for illustrating the manufacturing process of a nonaqueous electrolyte secondary battery in accordance with one embodiment.

The lithium ion secondary battery herein disclosed is characterized by being manufactured by performing an initial charging and discharging treatment on an assembly in which are accommodated in a battery case an electrode body having a positive electrode and a negative electrode, and a nonaqueous electrolyte. In other words, the manufacturing process of such a lithium ion secondary battery includes an assembly provision step (S10) and an initial charging and discharging step (S20) as shown in FIG. 1.

<Assembly Provision Step (S10)>

First, the assembly provision step (S10) will be described. The assembly provision step includes provision of an assembly in which an electrode body having a positive electrode and a negative electrode and a nonaqueous electrolyte are accommodated in a battery case.

The electrode body (e.g., a lamination type electrode body or a wound type electrode body) of the lithium ion secondary battery herein disclosed includes a positive electrode, a negative electrode, and a separator interposed between the positive electrode and the negative electrode. Herein, a description will be given by taking a wound type electrode body (wound electrode body) as an example. However, it is not intended that the present invention is limited to such a form.

Figure 2:
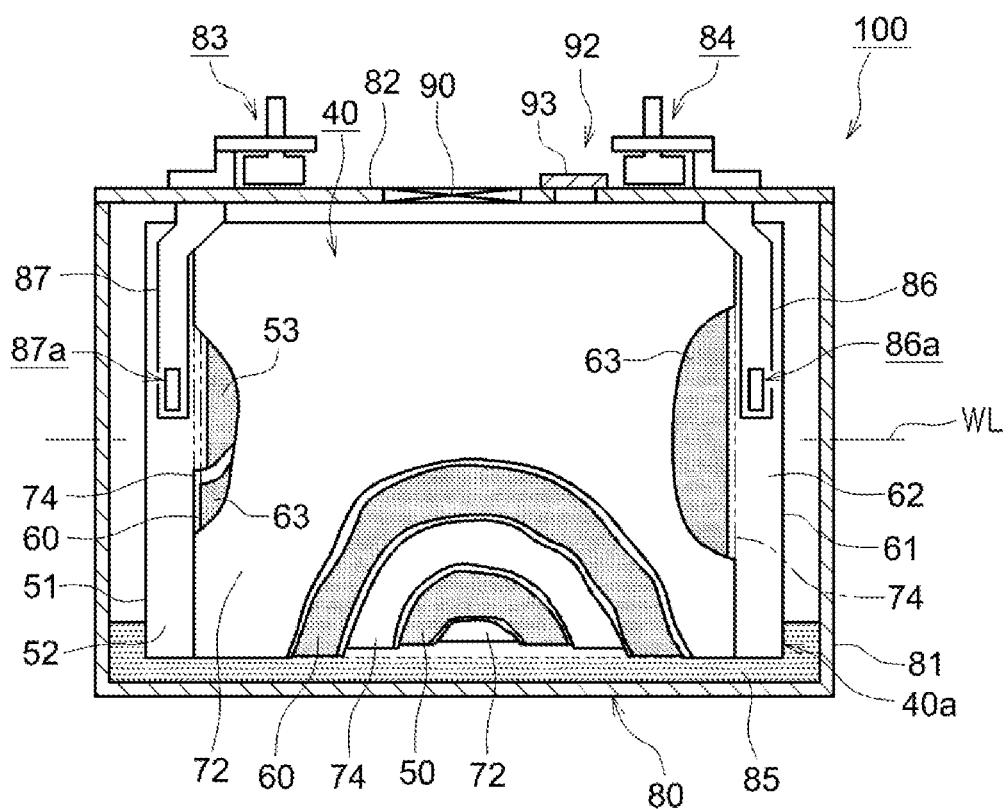
FIG. 2 is a view schematically showing the nonaqueous electrolyte secondary battery in accordance with one embodiment.
Figure 3:
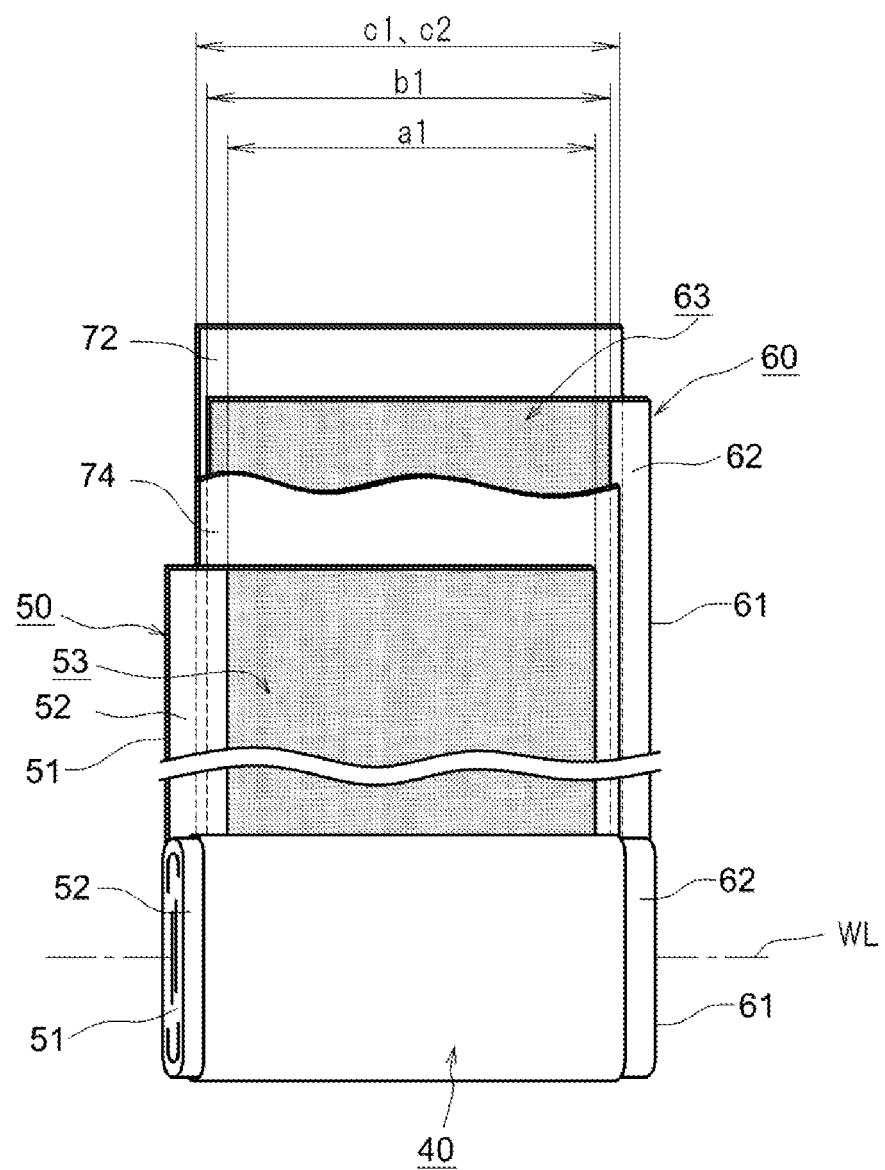
FIG. 3 is a view schematically showing a wound electrode body internally mounted in the nonaqueous electrolyte secondary battery in accordance with one embodiment.

A wound electrode body 40 includes, as shown in FIGS. 2 and 3, a long sheet-shaped positive electrode (positive electrode sheet 50), a long sheet-shaped negative electrode (negative electrode sheet 60), and a total of two long sheet-shaped separators (separators 72 and 74).

<Positive Electrode Sheet>

The positive electrode sheet 50 includes a positive electrode collector 52, and a positive electrode active material layer 53 containing a positive electrode active material. A positive electrode active material layer non-formation part 51 is set along the edge on one side in the width direction of the positive electrode collector 52. In the example shown, the positive electrode active material layer 53 is supported on each of the opposite sides of the positive electrode collector 52 except for the positive electrode active material layer non-formation part 51 set at the positive electrode collector 52. As the positive electrode collector, aluminum or an aluminum alloy mainly including aluminum is used as with the positive electrode collector for use in the positive electrode of a related-art lithium ion secondary battery.

As the positive electrode active materials, mention may be made of lithium-containing compounds which are materials capable of occluding and releasing lithium ions, and each contain a lithium element and one or two or more transition metal elements (e.g., lithium transition metal composite oxides). For example, mention may be made of lithium nickel composite oxides (e.g., $LiNiO_2$), lithium cobalt composite oxides (e.g., $LiCoO_2$), lithium manganese composite oxides (e.g., $LiMn_2O_4$), or ternary lithium-containing composite oxides such as lithium nickel cobalt manganese composite oxides (e.g., $LiNi_{1/3}Co_{1/3}Mn_{1/3}O_2$).

The positive electrode active material layer can contain given components such as a conductive material and a binder (binding agent) other than the positive electrode active materials, if required.

Any conductive materials are acceptable so long as they have been used for this kind of lithium ion secondary batteries in the related art, and the conductive materials are not limited to specific conductive materials. For example, carbon materials such as a carbon powder and a carbon fiber can be used. As the carbon powders, various carbon blacks (e.g., acetylene black, furnace black, and ketchen black), and graphite powder and the like can be used. Of these, one or two or more may be used in combination.

As the binder, the same one as the binder for use in a general lithium ion secondary battery can be appropriately adopted. For example, when as the composition for forming the positive electrode active material layer 53, a solvent type paste-like composition (the paste-like compositions contain a slurry-like composition and an ink-like composition) is used, a polymer material to be dissolved in an organic solvent (nonaqueous solvent) such as polyvinylidene fluoride (PVDF) or polyvinylidene chloride (PVDC) can be used. Alternatively, when an aqueous paste-like composition is used, a polymer material to be dissolved or dispersed in water can be preferably adopted. For example, mention may be made of polytetrafluoroethylene (PTFE) and carboxymethyl cellulose (CMC). Incidentally, the polymer materials exemplified above can be used as a thickener of the composition or other additives, other than being used as a binding agent.

Herein, the term "solvent type paste-like composition" denotes the concept indicating a composition mainly using an organic solvent as the dispersion medium of the positive electrode material. As the organic solvents, for example, N-methyl-2-pyrrolidone (NMP) can be used. The term "aqueous paste-like composition" denotes the concept indicating a composition using water or a mixed solvent mainly including water as the dispersion medium of the positive electrode active material. As the solvents other than water forming such a mixed solvent, one or two or more of the organic solvents (such as lower alcohols and lower ketones) capable of being uniformly mixed with water can be appropriately selected and used.

The positive electrode sheet 50 herein disclosed can be preferably manufactured, for example, generally, in the following manner. A paste-like positive electrode active material layer forming composition is prepared in which the positive electrode active material, the conductive material, the binder soluble in an organic solvent, and the like are dispersed in an organic solvent. The prepared composition is applied to the positive electrode collector 52, and dried, followed by compression (pressing). As a result, it is possible to manufacture a positive electrode including the positive electrode collector 52, and the positive electrode active material layer 53 formed on the positive electrode collector 52.

<Negative Electrode Sheet>

The negative electrode sheet 60 includes a negative electrode collector 62, and a negative electrode active material layer 63 containing a negative electrode active material. A negative electrode active material layer non-formation part 61 is set along the edge on one side in the width direction of the negative electrode collector 62. The negative electrode active material layer 63 is supported on each of the opposite sides of the negative electrode collector 62 except for the negative electrode active material layer non-formation part 61 set at the negative electrode collector 62. As the negative electrode collector 62, a conductive member formed of a metal with a good conductivity is used as with the collector for use in the negative electrode of a related-art lithium ion secondary battery. For example, copper, nickel, or alloys mainly including these can be used.

Examples of the negative electrode active material may include a particulate carbon material including a graphite structure (layered structure) in at least a part thereof, lithium transition metal composite oxides (e.g., lithium titanium composite oxides such as $Li_4Ti_5O_{12}$, and lithium transition metal composite nitrides. Examples of the carbon material may include natural graphite (e.g., flake graphite), synthetic graphite (artificial graphite), hardly graphitizable carbon (hard carbon), and easily graphitizable carbon (soft carbon). Alternatively, the surface of the negative active material may be covered with a non-crystalline carbon film. For example, by mixing the negative electrode active material with pitch, and burning the mixture, it is possible to obtain a negative electrode active material at least partially covered with a non-crystalline carbon film. The material is preferably a carbon material such as natural graphite.

The negative electrode active material layer 63 can contain given components such as a binder (binding agent) and thickener, other than the negative electrode active materials, if required.

As the binders, the same ones as the binders for use in the negative electrode of a general lithium ion secondary battery can be appropriately adopted. For example, when an aqueous paste-like composition is used for forming the negative electrode active material layer 63, a polymer material to be dissolved or dispersed in water can be preferably adopted. Examples of the polymer material to be dispersed in water (being water-dispersible) may include rubbers such as styrene-butadiene rubber (SBR), and fluoro rubber; fluorine type resins such as polyethylene oxide (PEO) and polytetrafluoroethylene (PTFE); and vinyl acetate copolymers.

Whereas, as the thickeners, polymer materials to be dissolved or dispersed in water or a solvent (organic solvent) can be adopted. Examples of the polymer material to be dissolved in water (being water-soluble) may include cellulose type polymers such as carboxymethyl cellulose (CMC), methyl cellulose (MC), cellulose acetate phthalate (CAP), and hydroxypropyl methyl cellulose (HPMC); and polyvinyl alcohol (PVA).

The negative electrode sheet 60 herein disclosed can be preferably manufactured, for example, generally, in the following manner. A paste-like negative electrode active material layer forming composition is prepared in which the negative electrode active material, and other given components (such as a binder and a thickener) are dispersed in a proper solvent (e.g., water). The prepared composition is applied to the negative electrode collector 62, and dried, followed by compression (pressing). As a result, it is possible to manufacture a negative electrode sheet 60 including the negative electrode collector 62, and the negative electrode active material layer 63 formed on the negative electrode collector 62.

As the separators 72 and 74, those known in the art can be used with no particular restriction. For example, a porous sheet formed of a resin (fine porous resin sheet) can be preferably used. Resin sheets of a porous polyolefin type such as polyethylene (PE) and polypropylene (PP) are preferable. For example, a PE sheet, a PP sheet, a sheet of a three-layer structure (PP/PE/PP structure) in which PP layers are stacked on the opposite sides of a PE layer, or the like can be preferably used. In this example, as shown in FIG. 2, the width b1 of the negative electrode active material layer 63 is slightly larger than the width a1 of the positive electrode active material layer 53. Further, the widths c1 and c2 of the separators 72 and 74 are slightly larger than the width b1 of the negative electrode active material layer 63 (c1, c2>b1>a1).

<Wound Electrode Body>

For manufacturing the wound electrode body 40, the positive electrode sheet 50, the separator 72, the negative electrode sheet 60, and the separator 74 are stacked with their respective longitudinal directions aligned. At this step, stacking is performed so that the positive electrode active material layer non-formation part 51 of the positive electrode sheet 50 and the negative electrode active material layer non-formation part 61 of the negative electrode sheet 60 respectively protrude from the opposite sides in the width direction of the separators 72 and 74. The lamination body stacked in this manner is wound around a winding axis WL set in the width direction orthogonal to the longitudinal direction. Then, the resulting wound body is crushed from one direction (side direction) to be flattened. As a result, a flat wound electrode body 40 is manufactured. In this embodiment, the wound electrode body 40 is pushed and bent flat in one direction orthogonal to the winding axis WL as shown in FIG. 3. Further, the positive electrode active material layer non-formation part 51 of the positive electrode sheet 50 and the negative electrode active material layer non-formation part 61 of the negative electrode sheet 60 are respectively exposed in a spiral form at the opposite sides of the separators 72 and 74. In this embodiment, as shown in FIG. 2, the intermediate portion of the positive electrode active material layer non-formation part 51 is gathered, and welded to collector tabs 87 and 86 of electrode terminals (internal terminals) arranged in the inside of a battery case 80. 87a and 86a in FIG. 2 indicate the welded portions. The wound electrode body 40 is welded to the collector tabs 87 and 86 at the side above the central part in the height direction of the wound electrode body 40.

In the assembly provision step (S10), as shown in FIG. 1, the manufactured wound electrode body 40 is accommodated in the battery case 80.

The battery case 80 is a battery case made of a metal (e.g., made of aluminum. Alternatively, also preferably made of a resin or made of a laminate film), and has a case main body 81 in a bottomed flat box shape (typically, a rectangular parallelepiped shape) opened in one side surface (herein, the top surface), and a lid body 82 closing the opening of the case main body 81. The lid body 82 seals the opening of the case main body 81 by welding or the like. A positive electrode terminal 83 to be electrically connected with the positive electrode sheet 50 of the wound electrode body 40 and a negative electrode terminal 84 to be electrically connected with the negative electrode sheet 60 of the wound electrode body 40 are provided at the top surface (i.e., the lid body 82) of the battery case 80. Further, the lid body 82 includes a liquid injection port 92 for injecting a nonaqueous electrolyte into the wound electrode body 40 accommodated in the case main body 81 (battery case 80) formed therein. The liquid injection port 92 is sealed by a sealing plug 93 after injection of the nonaqueous electrolyte. Further, the lid body 82 is provided with a safety valve 90 for discharging the gases generated inside the battery case 80 during battery failure to outside the battery case 80.

In this example, the wound electrode body 40 is accommodated in the battery case 80 while being deformed flat in one direction orthogonal to the winding axis WL, and so that the winding axis WL is in parallel with the lid body 82.

<Nonaqueous Electrolyte>

Whereas, in the assembly provision step (S10), after accommodating the wound electrode body 40 into the battery case 80, a nonaqueous electrolyte 85 is injected into the battery case 80 through the liquid injection port 92. Then, the liquid injection port 92 is sealed by the sealing plug 93, thereby to manufacture (provide) an assembly. The nonaqueous electrolyte 85 injected through the liquid injection port 92 penetrates the inside of the wound electrode body 40 from the shaft direction of the winding axis WL. From the viewpoint of preventing the liquid shortage, the amount of the electrolyte to be injected into the battery case 80 is desirably an amount enough to achieve the state in which the electrolyte spreads (penetrates) throughout the whole wound electrode body 40, and further for some electrolyte to remain as an excess. In other words, the nonaqueous electrolyte 85 may be desirably accommodated in the battery case 80 so as to leave an excess electrolyte left without being impregnated into the wound electrode body 40. The technology herein disclosed can be preferably carried out with the following mode: the nonaqueous electrolyte 85 is accommodated in the battery case 80 so as to leave an excess electrolyte left without being impregnated into the wound electrode body 40.

The nonaqueous electrolyte herein disclosed contains a fluorine-containing lithium salt as a supporting salt in a nonaqueous solvent. Specific examples of such a supporting salt may include $LiPF_6$, $LiBF_4$, $LiAsF_6$, and $LiSbF_6$. The lithium salts have a relatively higher lithium ion conductivity, and hence are preferable. Of these, $LiPF_6$ can be preferably used. The concentration of the supporting salt in the electrolyte has no particular restriction, and, for example, may be desirably comparable to the concentration of the electrolyte for use in a related-art lithium ion secondary battery. In general, it is possible to preferably use a nonaqueous electrolyte containing a supporting salt with a concentration of about 0.1 mol/L to 5 mol/L (e.g., about 0.8 mol/L to 1.5 mol/L).

As the nonaqueous solvents to be used for the nonaqueous electrolyte, aprotic solvents such as carbonates, esters, ethers, nitriles, sulfones, and lactones can be preferably used. Examples thereof may include ethylene carbonate (EC), propylene carbonate (PC), diethyl carbonate (DEC), dimethyl carbonate (DMC), ethyl methyl carbonate (EMC), 1,2-dimethoxyethane (DME), 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethyl formamide, dimethyl sulfoxide, sulfolane, and γ-butyrolactone (BL). These organic solvents can be used one kind alone, or in combination of two or more thereof.

<P-Oxalato Compound>

The nonaqueous electrolyte herein disclosed contains a P-oxalato compound as an additive. The P-oxalato compound is a compound expressed by a general formula (I): $A^+[PX_{6-2n}(C_2O_4)_n]^-$. In the formula (I), $A^+$ is a cation of an alkali metal such as Li, Na, or K. In a preferable one aspect, $A^+$ is a lithium cation ($Li^+$). Whereas, X is a halogen atom such as F, Cl, or Br. In a preferable one aspect, X is a fluorine atom (F). Whereas, n is 1, 2, or 3. In a preferable one aspect, n=2. In other words, as the P-oxalato compound, it is preferable to use a compound expressed by a general formula: $A^+[PX_4(C_2O_4)_n]^-$, (where in the formula, $A^+$ and n are the same as those in the general formula (I)). Such a P-oxalato compound can be manufactured by a known method, or is available by purchase of a commercially available product, or the like.

The P-oxalato compound is an oxalato complex compound having a structural portion in which at least one oxalic acid ion ($C_2O_4^{2-}$) is coordinated to phosphorus (P). The P-oxalato compound is decomposed at a prescribed charging voltage or higher, and forms a stable film at the surface of the negative electrode (typically, the negative electrode active material) at an initial charging and discharging step described layer. Specific examples of the P-oxalato compound may include lithium difluorobis(oxalato) phosphate expressed by the following formula (II) ($Li^+[PF_2(C_2O_4)_2]^-$). In a preferable one aspect, lithium difluorobis(oxalato) phosphate expressed by the following formula (II) is used mainly (i.e., in an amount of 50 mol % or more). Especially, lithium difluorobis(oxalato) phosphate is preferably used in an amount of 70 mol % or more (typically, 80 mol % or more, for example, 90 mol % or more). A P-oxalato compound substantially including only lithium difluorobis(oxalato) phosphate is in particular preferably used.

[Chem. 1]

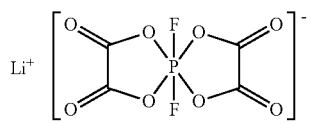

(II)

The content (addition amount) of the P-oxalato compound contained in the nonaqueous electrolyte is properly about 1.1 mass % or more (0.055 mol/L or more in terms of molar concentration), preferably 1.12 mass % or more, and more preferably 1.14 mass % or more when the total mass of the nonaqueous electrolyte is assumed to be 100 mass %. When the content of the P-oxalato compound is too small, the film derived from the P-oxalato compound formed on the surface of the negative electrode becomes more likely to be cracked. For this reason, cracking of the film derived from the compound causes the formation of another film (typically, a film formed of decomposed products of the nonaqueous electrolyte). Thus, the negative electrode resistance may increase with time. On the other hand, when the content of the P-oxalato compound is too large, the film derived from the compound becomes too thick. For this reason, the initial negative electrode resistance may tend to increase. Further, in a first charging and discharging step described later, a large quantity of gases are generated when the film derived from the P-oxalato compound is formed. This may unfavorably require an additional degassing step. From the viewpoint of reducing the initial resistance and the gas generation amount, the amount is about 1.2 mass % or less (0.06 mol/L or less in terms of molar concentration), preferably 1.18 mass % or less, and more preferably 1.16 mass % or less.

<Difluorophosphoric Acid Salt>

The nonaqueous electrolyte herein disclosed further contains difluorophosphoric acid salt. Difluorophosphoric acid salt is decomposed at a prescribed charging voltage or higher, and forms a good film on the surface of the positive electrode (typically, a positive electrode active material) in a first charging and discharging step described later, and can prevent the formation of another film (further, an increase in resistance). As difluorophosphoric acid salts, various salts having difluorophosphoric acid salt anion ($PO_2F_2^-$) can be used. The cation (counter cation) in such difluorophosphoric acid salt may be any of an inorganic cation and an organic cation. Specific examples of the inorganic cation may include cations of alkali metals such as Li, Na, and K; and cations of alkaline-earth metals such as Be, Mg, and Ca. Specific examples of the organic cation may include ammonium cations such as tetraalkyl ammonium and trialkyl ammonium. Such difluorophosphoric acid salts can be manufactured by a known method, or are available by purchase of commercially available products, or the like. In general, as difluorophosphoric acid salts, salts of difluorophosphoric acid anions and inorganic cations (e.g., alkali metal cations) are preferably used. As one preferable example of difluorophosphoric acid salt in the technology herein disclosed, mention may be made of lithium difluorophosphate ($LiPO_2F_2$).

The content (addition amount) of difluorophosphoric acid salt contained in the nonaqueous electrolyte has no particular restriction, and is properly about 0.4 mass % to 0.8 mass %, and is preferably 0.6 mass % to 0.7 mass % when the total mass of the nonaqueous electrolyte (i.e., the total amount of the nonaqueous electrolyte containing the P-oxalato compound and difluorophosphoric acid salt) is assumed to be 100 mass %. When difluorophosphoric acid salt and the P-oxalato compound are used in combination, the reaction of the P-oxalato compound is promoted at the negative electrode, so that a film thicker than necessary is formed. As a result, the negative electrode resistance may excessively increase. However, in accordance with the configuration, the ratios of difluorophosphoric acid salt and the P-oxalato compound are in a proper balance. For this reason, while suppressing an excessive increase in negative electrode resistance, the battery performance improving effect (e.g., the effect of suppressing an increase in positive electrode resistance) due to addition of difluorophosphoric acid salt can be properly exhibited. Therefore, more favorable battery performances can be exhibited with reliability.

<First Charging and Discharging Step (S20)>

Then, a first charging and discharging step (S20) will be described. The first charging and discharging step includes performing of an initial charging and discharging treatment on the assembly. By the charging treatment on the assembly, a film derived from the P-oxalato compound is formed on the surface of the negative electrode 60 (typically, the negative electrode active material contained in the negative electrode 60).

In this embodiment, an external power supply is connected between the positive electrode 50 and the negative electrode 60 of the assembly. The assembly is subjected to one cycle or a plurality of cycles of charging and discharging repeatedly. For example, the following operation is desirably performed: at ordinary temperatures (typically, about 25° C.), charging is performed until a prescribed potential (charging potential) at a constant current; then, discharging is performed until a prescribed potential (discharging potential) at a constant current. The maximum achievable voltage between the positive and negative electrode terminals in the first charging and discharging step varies according to the materials used and the like, but can be set at about 3.6 V to 4.9 V (e.g., 3.95 V to 4.2 V). The charging and discharging treatment may be performed by a process of performing charging and discharging at a constant current (CC charging, CC discharging), or may be performed by a process of performing charging or discharging at a constant voltage after performing charging or discharging at a constant current until the prescribed voltage (CCCV charging, CCCV discharging). The charging rate in CC charging has no particular restriction, but may be desirably set at, for example, 0.1 C to 2 C (typically, 0.5 C to 1.5 C, for example, 0.6 C to 1 C). Incidentally, the term "1 C" means the current amount capable of charging the battery capacity (Ah) expected from the theoretical capacity of the positive electrode in 1 hour.

After performing the first charging and discharging step in this manner, steps of degassing, quality inspection, and the like are performed, if required. As a result, manufacturing of the lithium ion secondary battery in accordance with the present embodiment is completed.

With the resulting lithium ion secondary battery 100, the nonaqueous electrolyte containing a P-oxalato compound in an amount of 1.1 mass % to 1.2 mass % is injected into the battery case 80; then, the assembly is subjected to an initial charging and discharging treatment, thereby to form a film derived from the P-oxalato compound on the surface of the negative electrode. Such a film derived from the P-oxalato compound is more rigid and thicker than in the related art, and hence cracking of the film with time is less likely to be caused. For this reason, with the lithium ion secondary battery 100 including a negative electrode having such a rigid and thick film derived from the P-oxalato compound, although the initial negative electrode resistance is slightly higher, the formation of another film (typically, a film formed of the decomposed products of the supporting salt (e.g., $LiPF_6$) of the nonaqueous electrolyte) resulting from cracking of the film is prevented, so that a further increase in resistance is less likely to be caused. For this reason, such a lithium ion secondary battery 100 is prevented from undergoing precipitation of lithium at the negative electrode even during a long-term use, and can exhibit desirable battery performances with stability.

Further, with the nonaqueous electrolyte secondary battery 100 herein disclosed, as shown in FIG. 2, the nonaqueous electrolyte 85 is accommodated in the battery case 80 so as to leave an excess electrolyte left without being impregnated into the wound electrode body 40. The excess electrolyte prevents the liquid shortage (electrolyte shortage) of the electrode body 40, and contributes to the improvement of the battery performances. On the other hand, when the film derived from the P-oxalato compound is cracked, another film formed of the decomposed products of the electrolyte tends to be formed at the portion at which the excess electrolyte is present. Accordingly, the resistance tends to increase with time. However, in accordance with the invention of the present aspect, another film formed of the decomposed products of the electrolyte can be prevented from being formed at the portion at which the excess electrolyte is present. As a result, it is possible to surely prevent an increase in resistance with time.

Further, with the nonaqueous electrolyte secondary battery 100 herein disclosed, as shown in FIGS. 2 and 3, the battery case 80 has a case main body 81 in a flat box shape opened in one side surface, and a lid body 82 closing the opening of the case main body 81. The lid body 82 is provided with a liquid injection port 92 for injecting the nonaqueous electrolyte. The electrode body 40 is a wound electrode body 40 in which the sheet-shaped positive electrode 50 and the sheet-shaped negative electrode 60 are wound with their respective longitudinal directions aligned, and around a winding axis WL set in the width direction orthogonal to the longitudinal direction. The wound electrode body 40 is accommodated in the battery case 80 while being deformed flat in one direction orthogonal to the winding axis WL, and so that the winding axis WL is in parallel with the lid body 82. In this case, as shown in FIG. 2, the excess electrolyte is accumulated at a lower R part 40a of the wound electrode body 40. For this reason, when a crack is caused in the film of the P-oxalato compound with time, another film formed of the decomposed products of the electrolyte tends to be formed at the lower R part 40a of the wound electrode body 40. However, in accordance with the invention of the present aspect, another film formed of the decomposed products of the electrolyte can be prevented from being formed at the lower R part 40a of the wound electrode body 40 at which the excess electrolyte is accumulated. As a result, it is possible to surely prevent an increase in resistance with time.

With the nonaqueous electrolyte secondary battery in accordance with the present invention, as described above, a rigid and thick film derived from a P-oxalato compound is formed at the surface of the negative electrode active material. Accordingly, the nonaqueous electrolyte secondary battery can exhibit desirable performances with stability even during long-term use, and hence can be preferably used as a power supply for the motor (electric motor) to be mounted in a vehicle such as a car. Such a secondary battery may be used in an assembled battery form including a plurality of the batteries connected in series and/or in parallel.

For example, respective secondary batteries (cells) forming the assembled battery are arrayed in a prescribed direction, and may be bound while being applied with a load in the array direction. In this case, the binding load can be set at 40 $kgf/cm^2$ or more (e.g., 40 $kgf/cm^2$ to 60 $kgf/cm^2$, and preferably 40 $kgf/cm^2$ to 50 $kgf/cm^2$). When a binding load of 40 $kgf/cm^2$ or more is applied thereto, in individual cells forming the assembled battery, the excess electrolyte tends to be accumulated at the lower part (typically, the lower R part 40a) of the wound electrode body. For this reason, when a crack is caused in the film of the P-oxalato compound with time, another film formed of the decomposed products of the electrolyte tends to be formed at the lower part of the wound electrode body. However, in accordance with the invention of the present aspect, in individual cells forming the assembled battery, another film formed of the decomposed products of the electrolyte can be prevented from being formed. As a result, it is possible to surely prevent an increase in resistance with time.

Such an assembled battery can be preferably used as a driving power supply to be mounted in a vehicle (typically, a car, particularly, a hybrid car (HV), a plug-in hybrid car (PHV), a car including an electric motor such as an electric car (EV)).

Below, a description will be given to some examples regarding the present invention. However, it is not intended that the present invention is limited to such specific examples.

Test Example 1

$LiNi_{1/3}Co_{1/3}Mn_{1/3}O_2$ as a positive electrode active material, acetylene black (AB) as a conductive material, and PVDF as a binding agent were mixed in NMP so that the mass ratios thereof become 90:8:2, thereby to prepare a paste-like composition for forming a positive electrode active material layer. The composition was applied to the opposite sides of 15 μm thick aluminum foil (positive electrode collector), and was dried. This resulted in a positive electrode sheet in which the positive electrode active material layers were formed on the opposite sides of the positive electrode collector.

A graphite powder as a negative electrode active material, SBR as a binding agent, and CMC as a thickener were mixed in water so that the mass ratios thereof became 98:1:1, thereby to prepare a paste-like composition for forming a negative electrode active material layer. The composition was applied to the opposite sides of 10 μm thick copper foil (negative electrode collector), and was dried. This resulted in a negative electrode sheet in which the negative electrode active material layers were formed on the opposite sides of the negative electrode collector.

As the nonaqueous electrolyte, there was used the one prepared by dissolving $LiPF_6$ as a supporting salt in a mixed solvent including ethylene carbonate (EC), dimethyl carbonate (DMC), and ethyl methyl carbonate (EMC) in a volume ratio of EC:DMC:EMC=30:40:30 in a concentration of 1.1 mol/L. Whereas, to the nonaqueous electrolyte, were added lithium difluorobis(oxalato) phosphate (hereinafter, LPFO) as a P-oxalato compound, and lithium difluorophosphoric acid salt ($LiPO_2F_2$) as difluorophosphoric acid salt. The content of $LiPO_2F_2$ based on the total amount of the nonaqueous electrolyte containing LPFO and $LiPO_2F_2$ was set at 0.8 mass %.

As the separator, a 20 μm thick porous film of a three-layered structure formed of polypropylene (PP)/polyethylene (PE)/polypropylene (PP) was used.

The positive electrode sheet and the negative electrode sheet were wound via two sheets of the separators. The wound body was crushed from the side direction, thereby to manufacture a flat wound electrode body. The wound electrode body thus obtained was accommodated in a box-shaped battery case made of a metal together with the nonaqueous electrolyte. The opening of the battery case was sealed. An assembly was provided in this manner.

In the present example, in the assembly provision step, the content of LPFO based on the total mass of the nonaqueous electrolyte was varied between 0.5 mass % to 1.3 mass %, thereby to manufacture assemblies. The content of $LiPO_2F_2$ was made constant at 0.8 mass % (see Table 1).

The respective manufactured assemblies were subjected to an initial charging and discharging treatment. Specifically, respective assemblies were each subjected to the following initial charging and discharging treatment: charging is performed at a constant current of 1 C until 4.1 V, and is suspended for 10 minutes, and then, discharging is performed at a constant current of 1 C until 3.0 V. In this manner, the lithium ion secondary batteries (cells for evaluation) were constructed.

<Measurement of Initial Capacity>

Each of the resulting cells for evaluation was charged at a constant current of 1 C under a temperature condition of 25° C. until the voltage across terminals became 4.1 V, followed by charging at a constant voltage until the current value became 0.01 C (CC-CV charging). After completion of charging, discharging was performed from 4.1 V to 3.0 V at a constant current of 1 C at 25° C. Subsequently, discharging was performed at a constant voltage until the current value became 0.01 C (CC-CV discharging). The discharge capacity at this step was referred to as an initial capacity. Incidentally, the initial capacity of the cell for evaluation was 4.0 Ah.

<Initial Negative Electrode Reaction Resistance>

Figure 4:
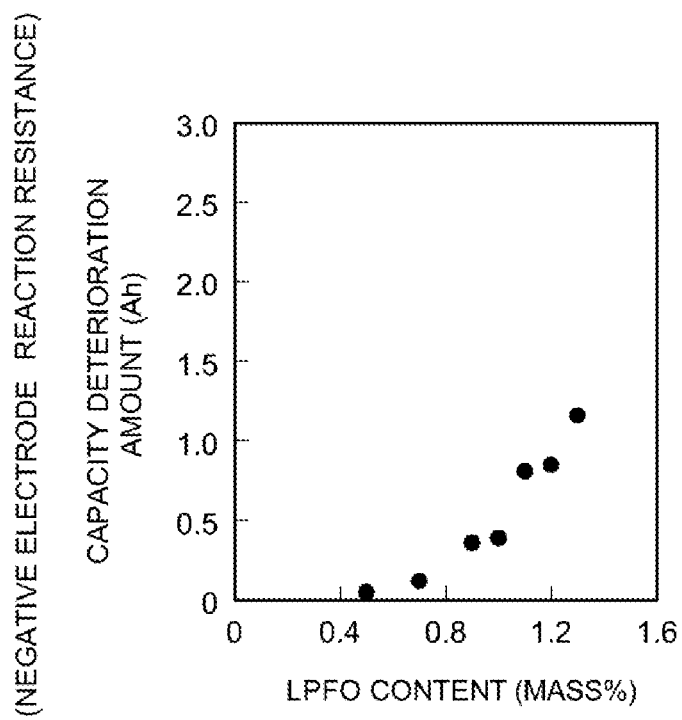
FIG. 4 is a graph showing the relationship between the content of LPFO and the initial capacity deterioration amount.

After measurement of the initial capacity, each of respective cells for evaluation was applied with a charging and discharging pattern of repeating high rate pulse charging and discharging at 130 A for 0.1 sec. Thus, a charging and discharging cycle test was performed. Specifically, a charging and discharging cycle of performing high rate pulse discharging at 130 A for 0.1 sec, and performing high rate pulse charging at 130 A for 0.1 sec under environment at about −30° C. was repeated 6000 times continuously. Then, the battery capacity after the charging and discharging cycle test was measured by the same procedure as in the <measurement of initial capacity>. Thus, the initial capacity deterioration amount=(initial capacity− battery capacity after the charging and discharging cycle test) was calculated. Herein, the capacity deterioration amount after the 0.1-sec high rate pulse charging and discharging cycle serves as an index for the negative electrode reaction resistance. Namely, it is indicated that, the larger the capacity deterioration amount is, the larger the negative electrode reaction resistance is. The results are shown in Table 1 and FIG. 4. FIG. 4 is a graph showing the relationship between the LPFO content and the initial capacity deterioration amount (initial negative electrode reaction resistance).

<High-Temperature Storage Test>

Further, each of respective cells for evaluation was subjected to a deterioration test due to high-temperature storage (acceleration test) in order to grasp a change in negative electrode reaction resistance with time. Specifically, each cell for evaluation was accommodated in a 60° C. thermostat. Thus, high temperature aging was carried out until the battery capacity decreased to 80% of the initial capacity. The battery capacity was measured in the same procedure as in the <measurement of initial capacity>.

<Negative Electrode Reaction Resistance after High-Temperature Storage Deterioration>

Figure 5:
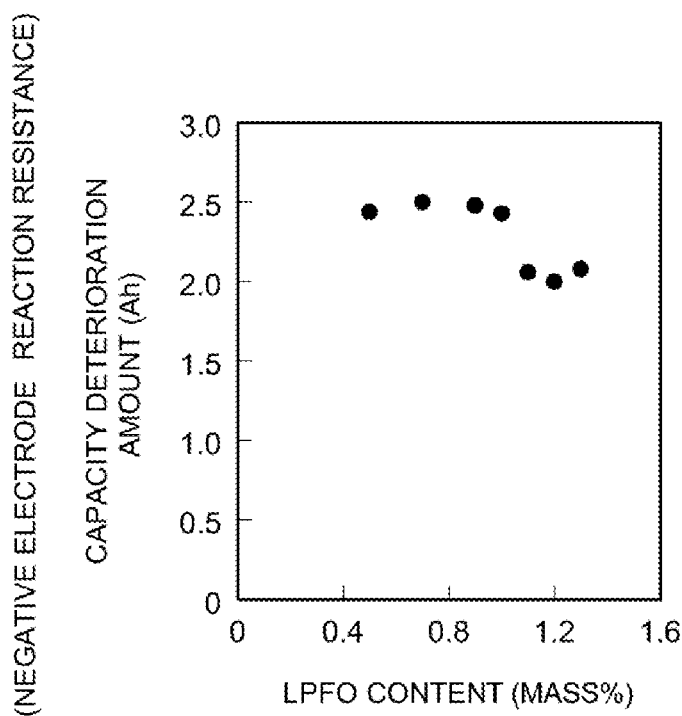
FIG. 5 is a graph showing the relationship between the content of LPFO and the capacity deterioration amount in the deteriorated state.

After the high-temperature storage test, each of respective cells for evaluation was subjected to a charging and discharging cycle test by the same procedure as with the <initial negative electrode reaction resistance>. Thus, the battery capacity after the charging and discharging cycle test was measured by the same procedure as with the <measurement of initial capacity>. Then, the capacity deterioration amount in a deteriorated state after high-temperature storage deterioration=(battery capacity after high-temperature storage test (i.e., initial capacity×0.8)− battery capacity after the charging and discharging cycle test) was calculated. The results are shown in Table 1 and FIG. 5. FIG. 5 is a graph showing the relationship between the LPFO content and the capacity deterioration amount in a deteriorated state (negative electrode reaction resistance after high-temperature storage deterioration).

TABLE 1

| LPFO content (mass %) | $LiPO_2F_2$ content (mass %) | Initial capacity deterioration amount (Ah) | Capacity deterioration amount in deteriorated state (Ah) |
| --- | --- | --- | --- |
| 0.5 | 0.8 | 0.05 | 2.44 |
| 0.7 | 0.8 | 0.12 | 2.5 |
| 0.9 | 0.8 | 0.36 | 2.48 |
| 1 | 0.8 | 0.39 | 2.43 |
| 1.1 | 0.8 | 0.81 | 2.06 |
| 1.2 | 0.8 | 0.85 | 2 |
| 1.3 | 0.8 | 1.16 | 2.08 |

As shown in Table 1, and FIGS. 4 and 5, for the samples with LPFO contents set at 0.5 mass % to 0.9 mass %, each initial capacity deterioration amount was lower than 0.5 Ah, and each initial negative electrode resistance was lower than those of other samples. However, each capacity deterioration amount in a deteriorated state was higher than 2.4 Ah. This indicates that the negative electrode resistance largely increases with time. Whereas, for the sample with the LPFO content set at 1.3 mass %, the initial capacity deterioration amount was higher than 1 Ah, and the initial negative electrode resistance largely increased than those of other samples.

In contrast, for the samples with the LPFO contents set at 1.1 mass % to 1.2 mass %, each initial capacity deterioration amount was 0.5 Ah or more and 1 Ah or less. As compared with the samples of 0.5 mass % to 0.9 mass %, each initial negative electrode resistance was slightly higher. However, all the capacity deterioration amounts in a deteriorated state were lower than 2.2 Ah. This indicates that the increase in resistance with time is more suppressed as compared with the samples of 0.5 mass % to 0.9 mass %. From the results, it could be confirmed that the secondary batteries with the LPFO contents set at 1.1 mass % to 1.2 mass % were slightly higher in initial resistance, but were suppressed from further increasing in resistance with time.

Test Example 2

Figure 6:
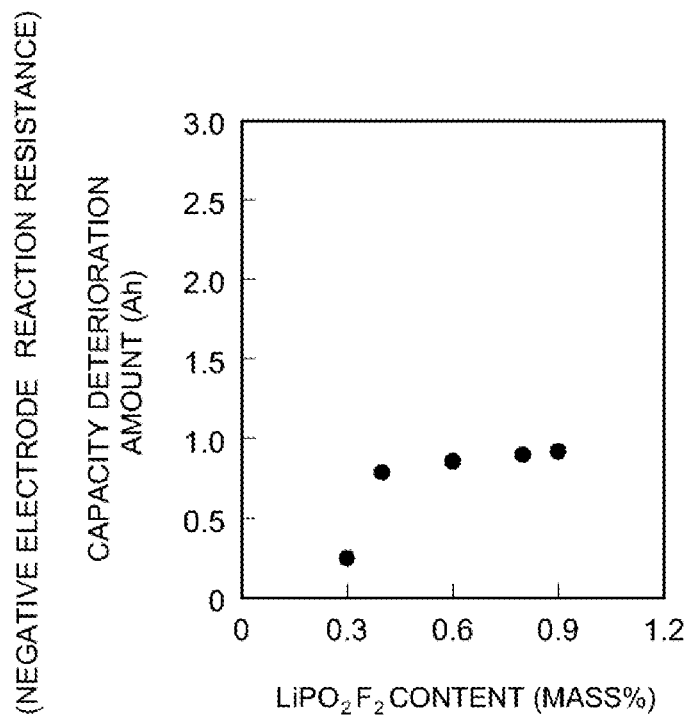
FIG. 6 is a graph showing the relationship between the content of $LiPO_2F_2$ and the initial capacity deterioration amount.
Figure 7:
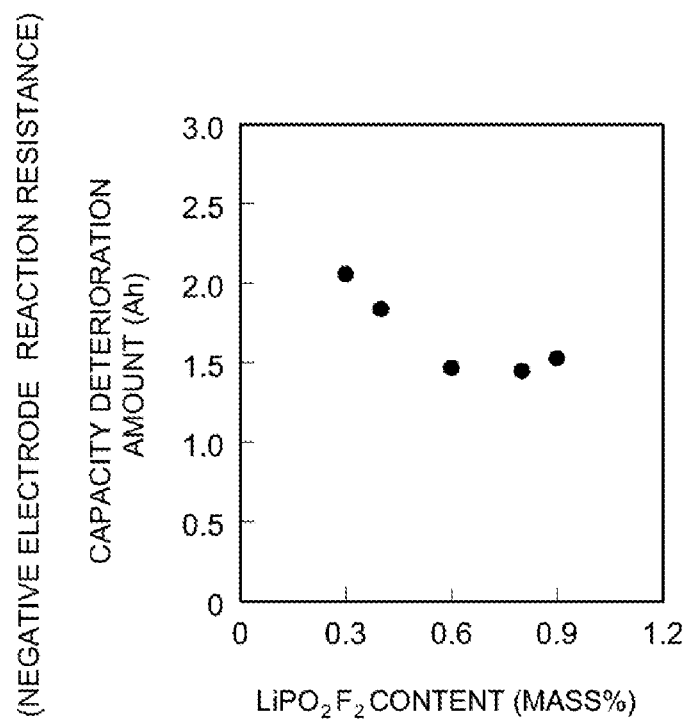
FIG. 7 is a graph showing the relationship between the content of $LiPO_2F_2$ and the capacity deterioration amount in the deteriorated state.

In the present example, in the assembly provision step, the content of $LiPO_2F_2$ based on the total amount of the nonaqueous electrolyte was varied between 0.3 mass % to 0.9 mass %, thereby to manufacture assemblies. The LPFO content was made constant at 1.2 mass %. Then, by the same procedure as with Test Example 1, a first charging and discharging step was performed. Then, the initial capacity, the initial capacity deterioration amount, and the capacity deterioration amount in a deteriorated state were measured. The results are shown in Table 2 and FIGS. 6 and 7. FIG. 6 is a graph showing the relationship between the $LiPO_2F_2$ content and the initial capacity deterioration amount (initial negative electrode reaction resistance). FIG. 7 is a graph showing the relationship between the $LiPO_2F_2$ content and the capacity deterioration amount in a deteriorated state (negative electrode reaction resistance after high-temperature storage deterioration).

TABLE 2

| LPFO content (mass %) | $LiPO_2F_2$ content (mass %) | Initial capacity deterioration amount (Ah) | Capacity deterioration amount in deteriorated state (Ah) |
| --- | --- | --- | --- |
| 1.2 | 0.3 | 0.25 | 2.06 |
| 1.2 | 0.4 | 0.79 | 1.84 |
| 1.2 | 0.6 | 0.86 | 1.47 |
| 1.2 | 0.8 | 0.9 | 1.45 |
| 1.2 | 0.9 | 0.92 | 1.53 |

As shown in Table 2, and FIGS. 6 and 7, for the sample with the $LiPO_2F_2$ content set at 0.3 mass %, the initial capacity deterioration amount was lower than 0.5 Ah, and the initial negative electrode resistance was lower than those of other samples. However, the capacity deterioration amount in a deteriorated state was higher than 2.0 Ah. This indicates that the negative electrode resistance largely increases with time. Whereas, the sample with the $LiPO_2F_2$ content set at 0.9 mass % showed an increase tendency in initial capacity deterioration amount as compared with other samples.

In contrast, for the samples with the $LiPO_2F_2$ contents set at 0.4 mass % to 0.8 mass %, each initial capacity deterioration amount was larger than that of the sample of 0.3 mass %, and each initial negative electrode resistance was higher. However, all the capacity deterioration amounts in a deteriorated state were lower than 2.0 Ah. This indicates that the increase in resistance with time is more suppressed as compared with the sample of 0.3 mass %. From the results, it could be confirmed that the secondary batteries with the $LiPO_2F_2$ contents set at 0.4 mass % to 0.8 mass % were slightly higher in initial resistance, but were suppressed from further increasing in resistance with time.

The technology herein disclosed can provide a nonaqueous electrolyte secondary battery including an electrode body having a negative electrode in which a film derived from a P-oxalato compound is formed on the surface of a negative electrode active material, a positive electrode, and separators; and a nonaqueous electrolyte, this nonaqueous electrolyte secondary battery being characterized by satisfying both of the following conditions (a) and (b):

(a) in the initial state (the state in which the battery capacity is not deteriorated) of the nonaqueous electrolyte secondary battery, the following charging and discharging cycle test is performed, under room temperature (about 25° C.) environment, the nonaqueous electrolyte secondary battery is subjected to high rate pulse discharging at 130 A (32.5 C) for 0.1 sec, and subjected to high rate pulse charging at 130 A (32.5 C) for 0.1 sec, with this charging and discharging as one cycle, the cycle is repeated 6000 times continuously;

the capacity deterioration rate determined from the battery capacity after the charging and discharging cycle test, and the initial capacity before the charging and discharging cycle test (=[the initial capacity– the battery capacity after the charging and discharging cycle test]×100/the initial capacity) is 25% or less (e.g., 19.7% to 25%, typically, 22.5% or less, and more preferably 21% or less); and (b) in a deteriorated state in which the battery capacity of the nonaqueous electrolyte secondary battery decreases to 80% of the initial capacity, the following charging and discharging cycle test is performed, under room temperature (about 25° C.) environment, the nonaqueous electrolyte secondary battery is subjected to high rate pulse discharging at 130 A (32.5 C) for 0.1 sec, and subjected to high rate pulse charging at 130 A (32.5 C) for 0.1 sec, with this charging and discharging as one cycle, the cycle is repeated 6000 times continuously;

the capacity deterioration rate determined from the battery capacity after the charging and discharging cycle test, and the battery capacity before the charging and discharging cycle test (i.e., the initial capacity×0.8) (=[(the initial capacity×0.8)– the battery capacity after the charging and discharging cycle test]×100/(the initial capacity×0.8)) is 55% or less (e.g., 36.3% to 55%, typically, 51.5% or less, and more preferably 46% or less).

Up to this point, the secondary battery herein proposed has been variously described. However, the present invention is not limited to any of the embodiments unless otherwise specified.

For example, the present invention is not limited to a square type battery. As other battery forms, a cylindrical battery, a laminate type battery, and the like are also acceptable. Herein, the cylindrical battery is a battery in which a wound electrode body is accommodated in a cylindrical battery case. Whereas, the laminate type battery is a battery in which a positive electrode sheet and a negative electrode sheet are stacked via separators. Further, as the electrode body of a secondary battery, the wound electrode body was exemplified. However, the battery may be formed of a so-called lamination type electrode body in which a positive electrode sheet and a negative electrode sheet are stacked with separators interposed alternately.

Further, herein, the lithium ion secondary battery was exemplified. However, the secondary batteries herein proposed can be adopted for other nonaqueous electrolyte secondary batteries than the lithium ion secondary battery, unless otherwise specified.

INDUSTRIAL APPLICABILITY

The technology herein disclosed provides a nonaqueous electrolyte secondary battery capable of being suppressed from increasing in resistance with time, and exhibiting desirable battery performances with stability.

The invention claimed is:

1. A nonaqueous electrolyte secondary battery, characterized by being manufactured by performing an initial charging and discharging treatment on an assembly, in which are accommodated in a battery case
an electrode body having a positive electrode and a negative electrode; and
a nonaqueous electrolyte consisting of a supporting salt, a nonaqueous solvent, a lithium difluorophosphate, and lithium difluorobis(oxalato) phosphate, wherein
a content of the lithium difluorobis(oxalato) phosphate is 1.1 mass % to 1.2 mass % when a total mass of the nonaqueous electrolyte is assumed to be 100 mass %,
a content of the lithium difluorophosphate is 0.4 mass % to 0.8 mass % when the total mass of the nonaqueous electrolyte is assumed to be 100 mass %,
an excess portion of the nonaqueous electrolyte is accumulated in the battery case without being impregnated into the electrode body,
the negative electrode includes a negative electrode active material, and
the negative electrode active material consists of a particulate carbon material.

2. The nonaqueous electrolyte secondary battery according to claim 1, wherein
the battery case comprises a case body in a flat box shape opened in one side surface and a lid closing the opening of the case body, and
the electrode body is a flat-shaped wound electrode body deformed flat in one direction orthogonal to a winding axis of the wound electrode body, and is accommodated in the battery case so that the winding axis is in parallel with the lid, wherein
the excess portion of the nonaqueous electrolyte without being impregnated into the electrode body is accumulated at a position where a lower R part of the wound electrode body is disposed in the battery case.

3. The nonaqueous electrolyte secondary battery according to claim 1, wherein the supporting salt comprises one or more selected from the group consisting of $LiPF_6$, $LiBF_4$, $LiAsF_6$, and $LiSbF_6$.

4. The nonaqueous electrolyte secondary battery according to claim 1, wherein the supporting salt is selected from the group consisting of $LiPF_6$, $LiBF_4$, $LiAsF_6$, and $LiSbF_6$.

5. The nonaqueous electrolyte secondary battery according to claim 1, wherein the supporting salt is a lithium salt.

6. The nonaqueous electrolyte secondary battery according to claim 1, wherein the nonaqueous solvent comprises an organic solvent.

7. The nonaqueous electrolyte secondary battery according to claim 5, wherein the nonaqueous solvent comprises an organic solvent.

8. The nonaqueous electrolyte secondary battery according to claim 1, wherein the nonaqueous solvent comprises one or more selected from the group consisting of carbonates, esters, ethers, nitriles, sulfones, and lactones.

9. The nonaqueous electrolyte secondary battery according to claim 1, wherein the nonaqueous solvent is selected from the group consisting of carbonates, esters, ethers, nitriles, sulfones, and lactones.

10. The nonaqueous electrolyte secondary battery according to claim 5, wherein the nonaqueous solvent is selected from the group consisting of carbonates, esters, ethers, nitriles, sulfones, and lactones.

11. The nonaqueous electrolyte secondary battery according to claim 5, wherein the nonaqueous solvent is an organic solvent selected from the group consisting of carbonates, esters, ethers, nitriles, sulfones, and lactones.

12. The nonaqueous electrolyte secondary battery according to claim 1, wherein the lithium difluorobis(oxalato) phosphate is the only compound in the nonaqueous electrolyte that falls within the scope of the following formula (I):

$$A^+[PX_{6-2n}(C_2O_4)_n]^- \qquad (I);$$

wherein, in formula (I), $A^+$ is a cation of an alkali metal, X is a halogen atom, and n is 1, 2, or 3.

13. A battery assembly before an initial charging and discharging treatment for manufacturing a nonaqueous electrolyte secondary battery, comprising
an electrode body having a positive electrode and a negative electrode;
a nonaqueous electrolyte; and
a battery case in which the electrode body and the nonaqueous electrolyte are accommodated, wherein
the nonaqueous electrolyte consists of a supporting salt, a nonaqueous solvent, a lithium difluorophosphate, and lithium difluorobis(oxalato) phosphate, wherein
a content of lithium difluorobis(oxalato) phosphate is 1.1 mass % to 1.2 mass % when a total mass of the nonaqueous electrolyte is assumed to be 100 mass %,
a content of the lithium difluorophosphate is 0.4 mass % to 0.8 mass % when the total mass of the nonaqueous electrolyte is assumed to be 100 mass %,
an excess portion of the nonaqueous electrolyte is accumulated in the battery case without being impregnated into the electrode body,
the negative electrode includes a negative electrode active material, and
the negative electrode active material consists of a particulate carbon material.

14. The battery assembly according to claim 13, wherein
the battery case comprises a case body in a flat box shape opened in one side surface and a lid closing the opening of the case body, and
the electrode body is a flat-shaped wound electrode body deformed flat in one direction orthogonal to a winding axis of the wound electrode body, and is accommodated in the battery case so that the winding axis is in parallel with the lid, wherein
the excess portion of the nonaqueous electrolyte without being impregnated into the electrode body is accumulated at a position where a lower R part of the wound electrode body is disposed in the battery case.

15. The battery assembly according to claim 13, wherein the lithium difluorobis(oxalato) phosphate is the only compound in the nonaqueous electrolyte that falls within the scope of the following formula (I):

$$A^+[PX_{6-2n}(C_2O_4)_n]^- \qquad (I);$$

wherein, in formula (I), $A^+$ is a cation of an alkali metal, X is a halogen atom, and n is 1, 2, or 3.

* * * * *